United States Patent
Levine et al.

(10) Patent No.: US 7,318,796 B2
(45) Date of Patent: Jan. 15, 2008

(54) TWO-LAYER DRUM COVER MADE OF A METAL ALLOY IN THE WARP DIRECTIONS AND A PLURALITY OF METAL ALLOYS IN THE SHUTE DIRECTIONS ON BOTH FRONT AND BACK SURFACES

(75) Inventors: Mark J. Levine, Hendersonville, TN (US); Thomas L. Israel, Appleton, WI (US); Gregory D. Zilker, Brush Prarie, WA (US)

(73) Assignee: Albany International Corp., Albany, NY (US)

( * ) Notice: Subject to any disclaimer, the term of this patent is extended or adjusted under 35 U.S.C. 154(b) by 507 days.

(21) Appl. No.: 10/848,711

(22) Filed: May 19, 2004

(65) Prior Publication Data

US 2005/0260364 A1 Nov. 24, 2005

(51) Int. Cl.
*B05C 11/00* (2006.01)
*D03D 15/00* (2006.01)
(52) U.S. Cl. .................. 492/48; 492/50; 492/52; 492/54; 492/58; 442/197; 442/209
(58) Field of Classification Search .................. 492/50, 492/51, 52, 32, 28; 442/52, 197, 206–209, 442/217, 23, 195
See application file for complete search history.

(56) References Cited

U.S. PATENT DOCUMENTS 3,006,384 A * 10/1961 Brown et al. ........... 139/425 A
3,175,792 A * 3/1965 Smallian ..................... 245/8
3,425,900 A * 2/1969 Purdy ......................... 162/348
3,632,068 A   1/1972 Weir et al.
5,626,234 A   5/1997 Cook et al.
6,331,268 B1  12/2001 Kauschke et al.

FOREIGN PATENT DOCUMENTS

EP 0 902 121 A 3/1999
GB 389068 A 3/1933

* cited by examiner

*Primary Examiner*—David P. Bryant
*Assistant Examiner*—Sarang Afzali
(74) *Attorney, Agent, or Firm*—Frommer Lawrence & Haug LLP; Ronald R. Santucci (57) ABSTRACT

A two-layer drum cover and a method of producing the same are provided. The two-layer drum cover includes a backing wire constructed of a relatively high grade metal alloy in the warp direction and alternating relatively low grade metal alloys in the shute direction. The two-layer drum cover also includes a face wire constructed of a relatively high grade metal alloy in the warp direction and alternating relatively low grade metal alloys in the shute direction. All the metal alloys used in the face wire have a higher grade than the metal alloys used in the backing wire.

9 Claims, 7 Drawing Sheets

TWO-LAYER DRUM COVER MADE OF A METAL ALLOY IN THE WARP DIRECTIONS AND A PLURALITY OF METAL ALLOYS IN THE SHUTE DIRECTIONS ON BOTH FRONT AND BACK SURFACES

FIELD OF THE INVENTION

The present invention is directed towards the preparation of slurry for use in fibrous material production, and more particularly, towards the preparation of slurry to be used in the production of fibrous materials such as fiber cement or paper.

BACKGROUND OF THE INVENTION

Fiber cement is commonly used as siding in the housing industry due to the many advantages it provides. For instance fiber cement does not rot or deteriorate and therefore, provides long-term durability. Further, fiber cement is non-combustible.

The production of fiber cement begins with a mixture of a special type of cement, silica, and fibers. Although asbestos fibers were once used in the production of fiber cement, now plastic fibers, carbon fibers, and wood fibers are more commonly found in fiber cement. The mixture is approximately 80% cement and silica and 20% fiber. The fibers act in a manner similar to reinforcing rods used in concrete.

Figure 1:
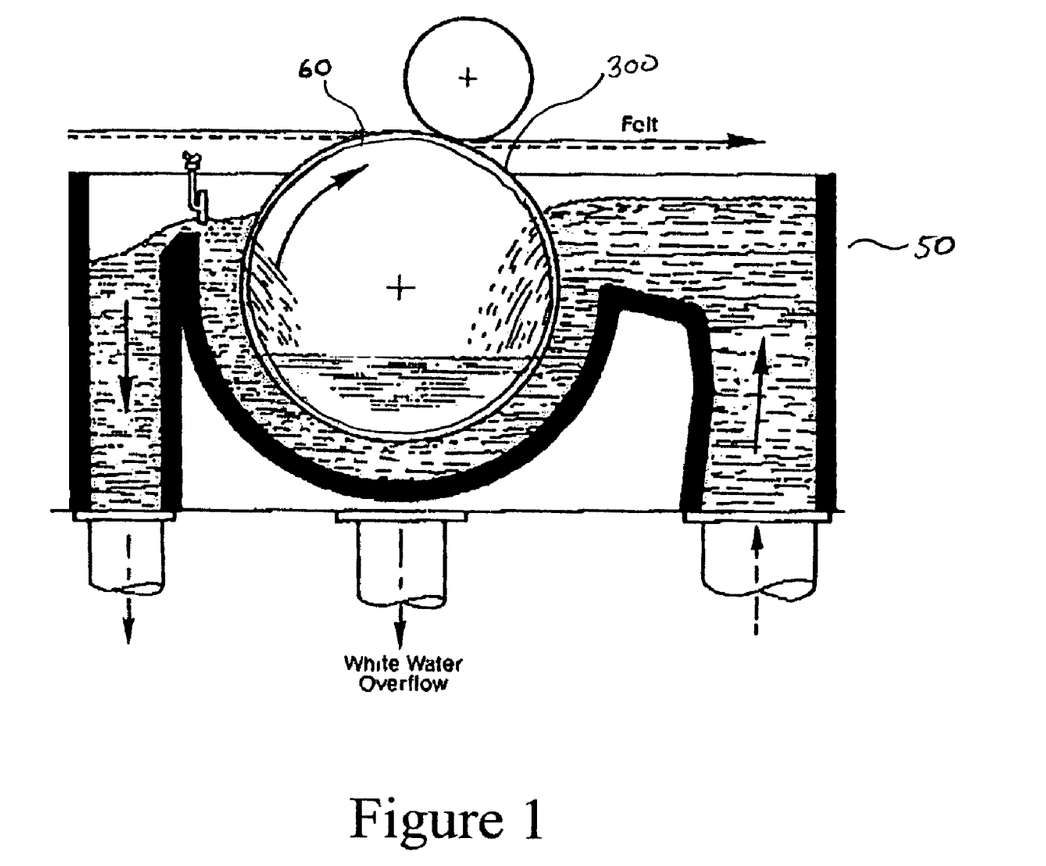
FIG. 1 is a graphic representation of a cylinder for use in the formation of fiber cement.

Water is added to the cement, silica, and fiber mixture to form a slurry with a consistency ranging from 4% to 12% depending on the rate of production and type of product produced. The slurry has an unusually high alkalinity ranging from a pH of 9.0 to 13.0. The slurry is added to an individual cylinder or a cascading arrangement depending on the type of machine. In the cascading arrangement, the slurry is fed to the first cylinder and overflows from the first cylinder to the next cylinder. FIG. 1 depicts an example of a cylinder.

After which, the slurry is formed into a sheet on a wire-covered cylinder mold by a head-differential between the inside and outside of the cylinder mold. The sheet is couched to a felt that contacts the top of the cylinder mold and carries the wet fibrous mat to the next cylinder, if necessary, where it picks up another ply or layer.

Due to the tenderness of the sheet formed in the early stages of formation, a great deal of vacuum equipment is used in a vacuum zone to remove water from the formed sheet rather than applying pressure. Once the sheet is sufficiently set, a press is used to remove free water.

Figure 1B:
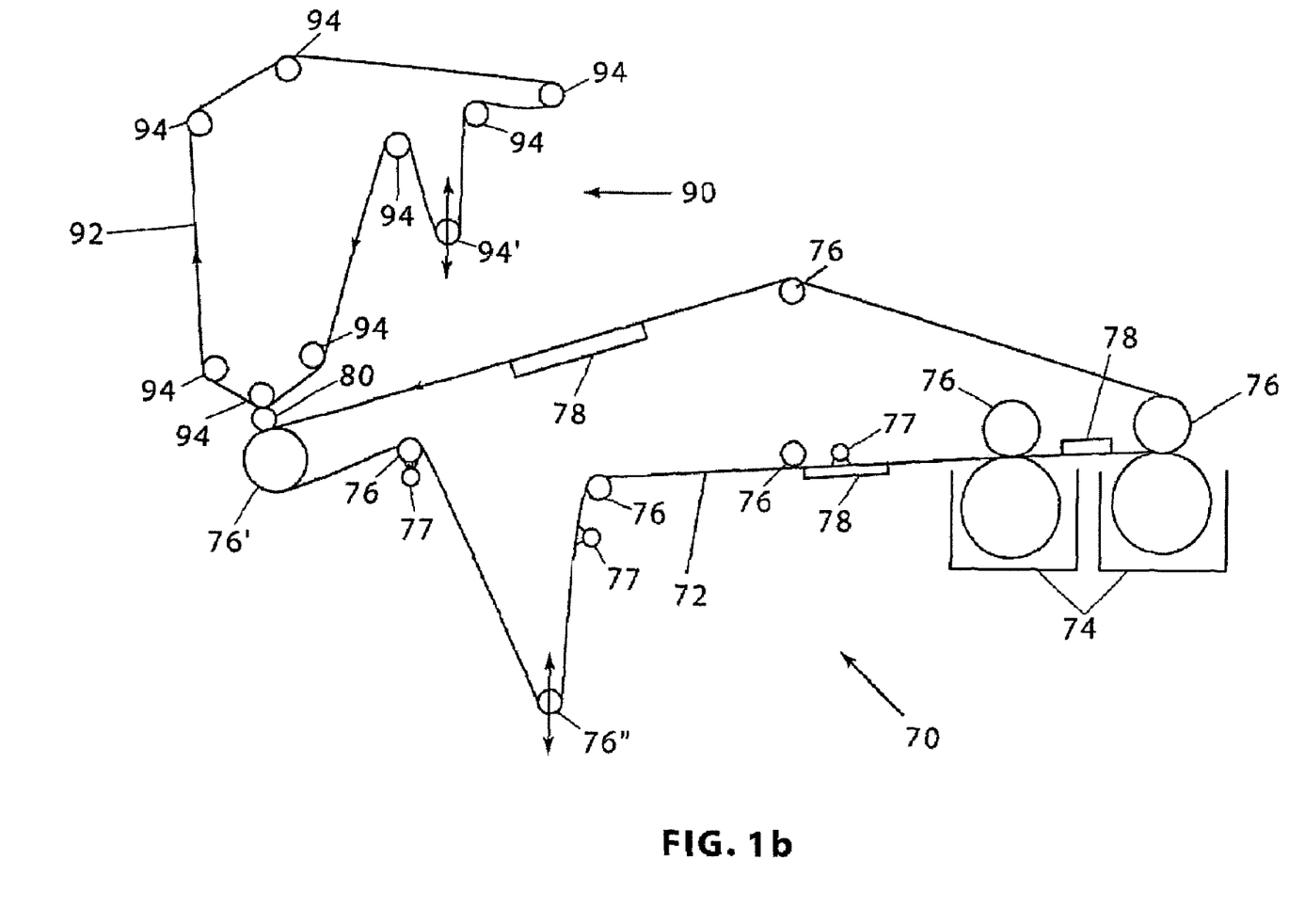
FIG. 1b is a plan diagram of an illustrative two-cylinder fiber cement production machine.

FIG. 1b is a plan diagram of an illustrative two-cylinder fiber cement production machine. The machine includes a forming section 70 for generating fiber cement in a layered form, a mandrel 80 for accumulating the generated layered material, and a conveyor section 90 for transferring the accumulated material from the mandrel to other locations.

As can be seen from FIG. 1b, the forming section includes a felt belt 72, which moves in a generally counterclockwise direction within the figure, and two cylinders 74, each of which may be the same or similar to the cylinder shown in FIG. 1. As the felt passes the first cylinder a layer of material is deposited on the felt's underside. As the felt passes the second cylinder a second layer is added. Movement of the felt is controlled through a system of rollers that include: a number of rollers 76 for guiding the felt along its path, a main drive roller 76' for driving the belt along its direction of motion, and a float roll 76" for maintaining desired belt tension. The felt is rinsed at various points along its path by several rinsing heads 77. Drying of the felt at desired points is achieved through the use of vacuum boxes 78.

The multi-layered material created on the felt of the forming section is accumulated on mandrel 80 and transferred from mandrel 80 by conveyor section 90.

The conveyor section includes a conveyor belt 92, a series of rollers 94 for controlling movement of the conveyor belt, a float roll 94' for controlling the conveyor belt tension.

Having discussed the production of fiber cement in general, the production of paper will now be discussed in general.

Figure 2:
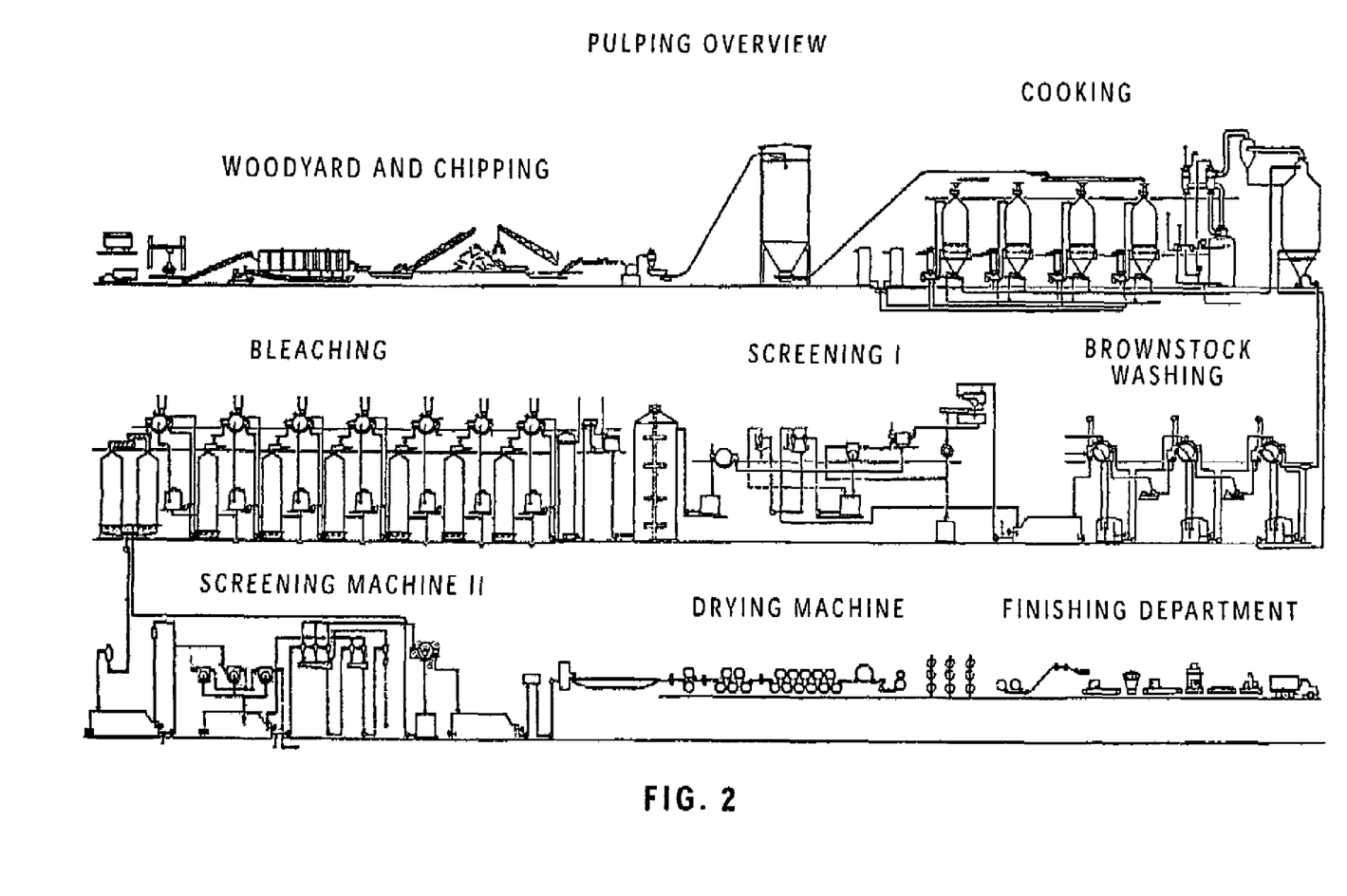
FIG. 2 is a graphic representation of the pulping process.

The production of paper begins with the processing of wood. Wood is chiefly composed of two major substances; both are organic, that is, their molecules are built around chains and rings of carbon atoms. Cellulose, which occurs in the walls of the plant cells, is the fibrous material that is used to make paper. Lignin is a large, complex molecule; it acts as a kind of glue that holds the cellulose fibers together and stiffens the cell walls, giving wood its mechanical strength. In order to convert wood into pulp suitable for making paper, the cellulose fibers must be freed from the lignin. FIG. 2 depicts an example of the pulping process. In mechanical pulping this is done by tearing the wood fibers apart physically to create groundwood pulp, leaving most of the lignin intact in the pulp. The high lignin content of groundwood pulp leaves the paper products weak and prone to degradation (e.g. yellowing) over time. Mechanical pulp is used principally to manufacture newsprint and some magazines.

In most pulp production lignin is separated from the fibers chemically. For example, in the kraft process, wood chips are heated ("cooked") in a solution of sodium hydroxide and sodium sulfide. The lignin is broken down into smaller segments and dissolves into the solution. In the next step, "brownstock washing," the breakdown products and chemicals are washed out of the pulp and sent to the recovery boiler. Kraft unbleached pulp has a distinctive dark brown color, due to darkened residual lignin, but is nevertheless exceptionally strong and suitable for packaging, tissue and toweling.

For brighter and more durable products the pulp must be bleached. In the bleaching process, the color in the residual lignin is either neutralized (by destroying the chromophoric groups) or removed with the lignin. This process traditionally has been accomplished for kraft pulp by chlorine bleaching, usually followed by washing and extraction of the chemicals and breakdown products. This process is not much different than washing clothes, the stains imbedded in cloth fibers are either neutralized by bleach, or broken down and washed out.

In current pulp production processes, the lignin solution typically undergoes two or more separate washing operations. For example, the groundwood or wood chips are first processed with chemicals under pressure and temperature, either usually by the kraft process or by the sulfite acid process. In either process, digestion dissolves the lignins thereby freeing the fibers and placing the lignin components into solution. In both processes the resulting liquid is dark in color, and the residual liquid which does not drain from the pulp and the remaining contaminants must be washed from the pulp. Further, it is desirable to recover spent liquid at as high a concentration as practical to minimize the cost of the subsequent recovery of chemicals.

Brown pulp which has been so washed retains a definite brown color and the pulp which remains is usually too highly colored for making white paper. Also, if any lignin is present, paper made from such pulp may not have a high degree of permanence and will yellow in time. Therefore, it is common and conventional to apply a bleaching process to the pulp, not only to improve whiteness, but to improve permanence of the whiteness.

The bleaching commonly is performed in a chlorination stage by applying water in which chlorine gas has been dissolved. Other bleaching processes may be used, such as a sodium hydrosulphite process, as is well known in the art. Three chemicals that are commonly used in current bleaching operations are sodium hydroxide (NaOH), chlorine dioxide ($ClO_2$) and hydrogen peroxide ($H_2O_2$). Bleaching may not be accomplished in a single stage and may be performed in two or more stages, each followed by washing. After bleach treatments, the pulp is subjected to a washing action to remove the water that contains the spent bleaching agents and dissolved lignin.

For example, one method of removing the water containing the spent bleaching agents and dissolved lignin involves the use of a belt-type pulp washing machine that includes a dewatering stage (or "formation zone") and multiple counter-current washing stages (or collectively "displacement zone"). The formation zone of the machine employs an endless moving foraminous belt which extends about a breast roll defining an on-running end and a couch roll defining an off-running end, with a generally horizontal upper run of the belt extending between the rolls. A series of suction boxes located underneath the belt provide for initial dewatering of the pulp in the formation zone, and combine with a series of showers to provide washing and dewatering in the displacement zone.

Figure 3:
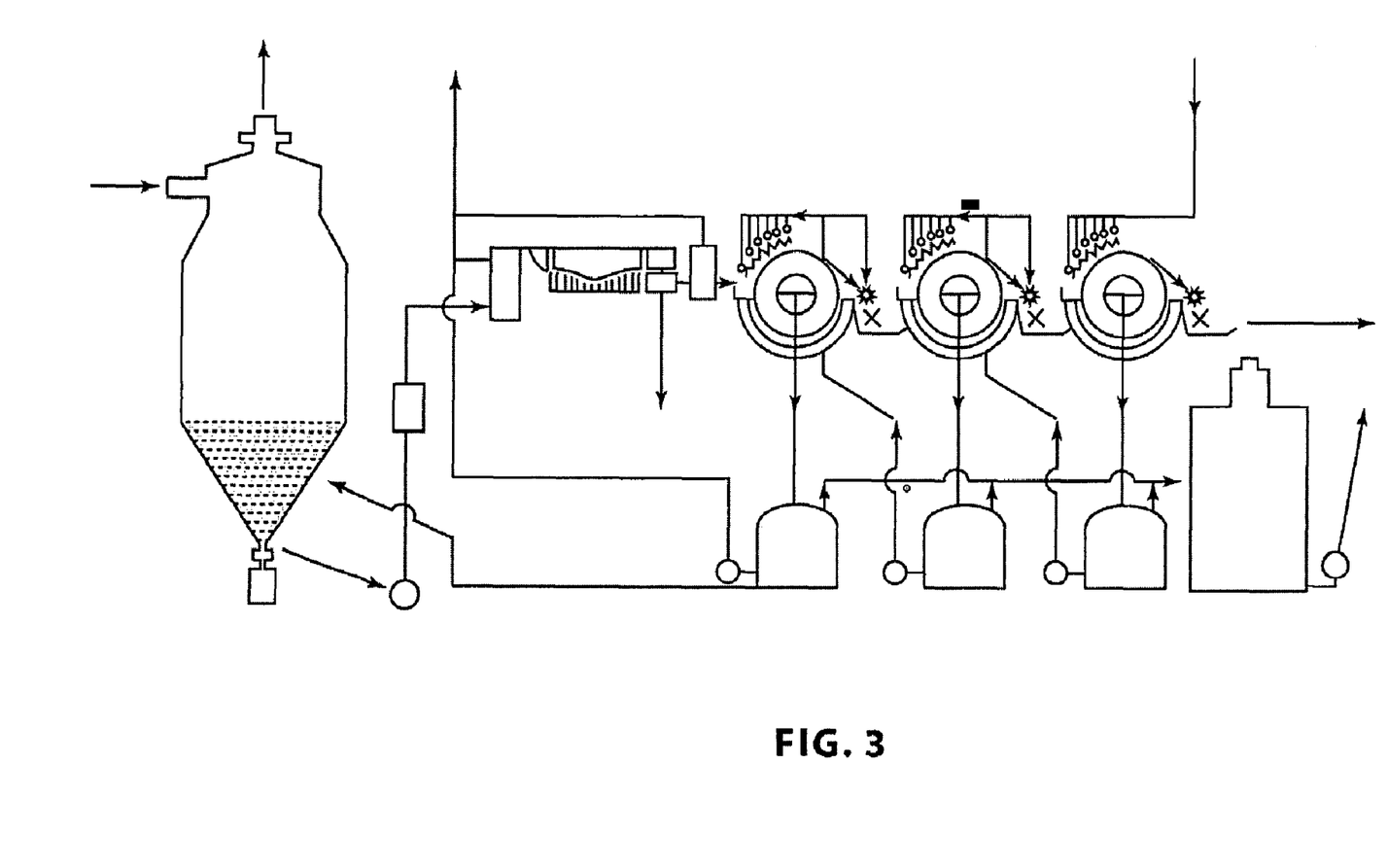
FIG. 3 is a graphic representation of the flow sequence for countercurrent rotary brown stock washers.
Figure 4:
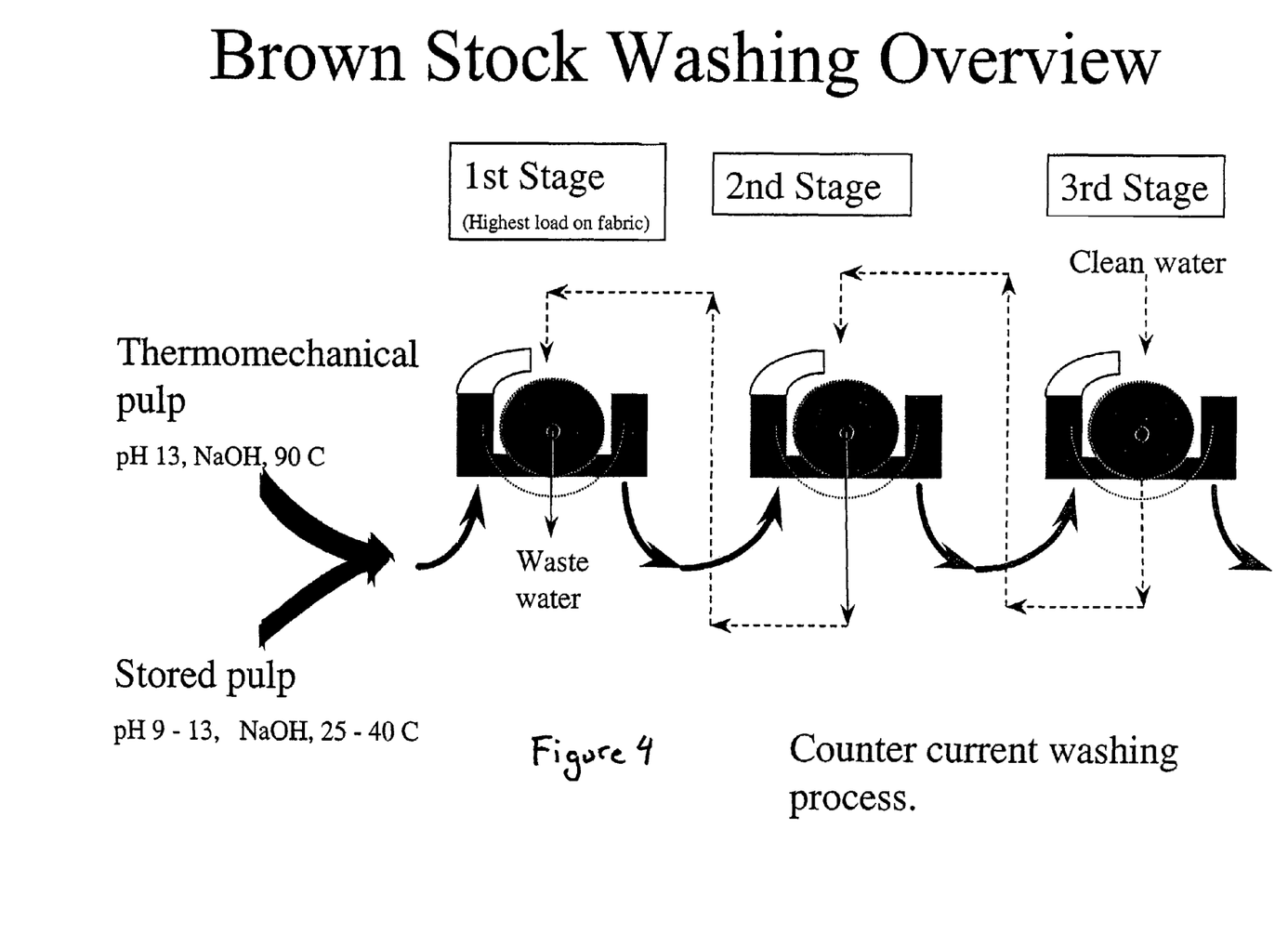
FIG. 4 is a graphic representation of a brown stock washing process.

As shown in FIG. 3, downstream from the belt washer a series of washing zones or stages to which a washing liquid is applied from above for drainage through the pulp mat. As can be seen in FIG. 4, the freshest or cleanest washing liquid is applied to the zone nearest the last working stage and the liquid drained through the mat at that zone is collected and delivered to the immediately preceding washing zone. This is repeated from zone to zone, so that the cleanest pulp is treated with the cleanest water, and the dirtiest pulp is treated with the dirtiest water.

Both fiber cement production and paper pulp production, utilize a drum covered by a two-layer drum cover constructed of two independently woven metal wires. The first wire, which is more commonly referred to as a "backing" wire, is attached to the drum first and is typically constructed of a high-grade bronze warp and a lower grade bronze shute. The second wire, which is more commonly referred to as a "face" wire, is the main support of the two-layer drum system and consists of metal alloys having a higher grade than the metal alloys used for the backing wire.

SUMMARY OF THE INVENTION

The inventors of the present invention have recognized several deficiencies of prior two-layer drum covers.

In particular, the inventors have noted that due to the highly corrosive environment during use, the backing wire and face wire tend to corrode leading to the failure of the drum wires. As previously mentioned, the face wire is the main support of the two-layer drum system. Therefore, it would be advantageous to delay the corrosion of the face wire as much as possible.

In order to overcome the drawbacks of prior two-layer drum covers, the two-layer drum cover of the present invention utilizes the "Sacrificial Anode" principle. More specifically, the present invention use multiple metal alloys in order to create a multiple stage sacrificial anode. The advantages provided by the multiple stage sacrificial anode include an increased drum life and a reduced frequency of replacing the drum cover.

BRIEF DESCRIPTION OF THE DRAWINGS

Thus by the present invention, its objects and advantages will be realized, the description of which should be taken in conjunction with the drawings wherein.

DETAILED DESCRIPTION OF THE PREFERRED EMBODIMENTS

Figure 5:
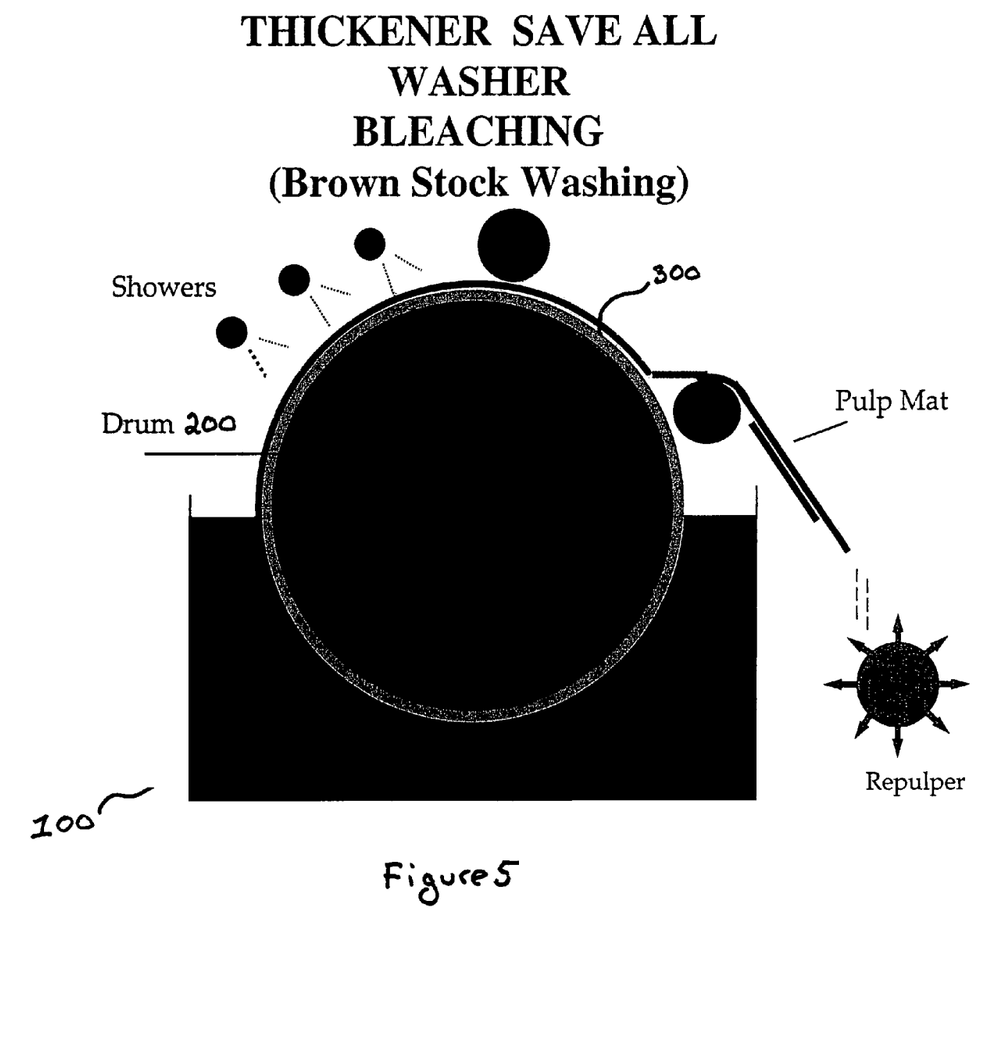
FIG. 5 is a cross-sectional view of a drum suitable for use in a countercurrent rotary brown stock washer.

FIG. 1 depicts a cross sectional view of a cylinder 50 including a drum 60. FIG. 5 depicts a cross sectional view of washing zone 100 including a drum 200. A two-layer drum cover 300 protects drum 60 in cylinder 50 (see FIG. 1) and drum 200 in washing zone 100 (see FIG. 5). The two-layer drum cover 300 is constructed of a backing wire 310 and a face wire 320 (see FIG. 6).

Figure 6:
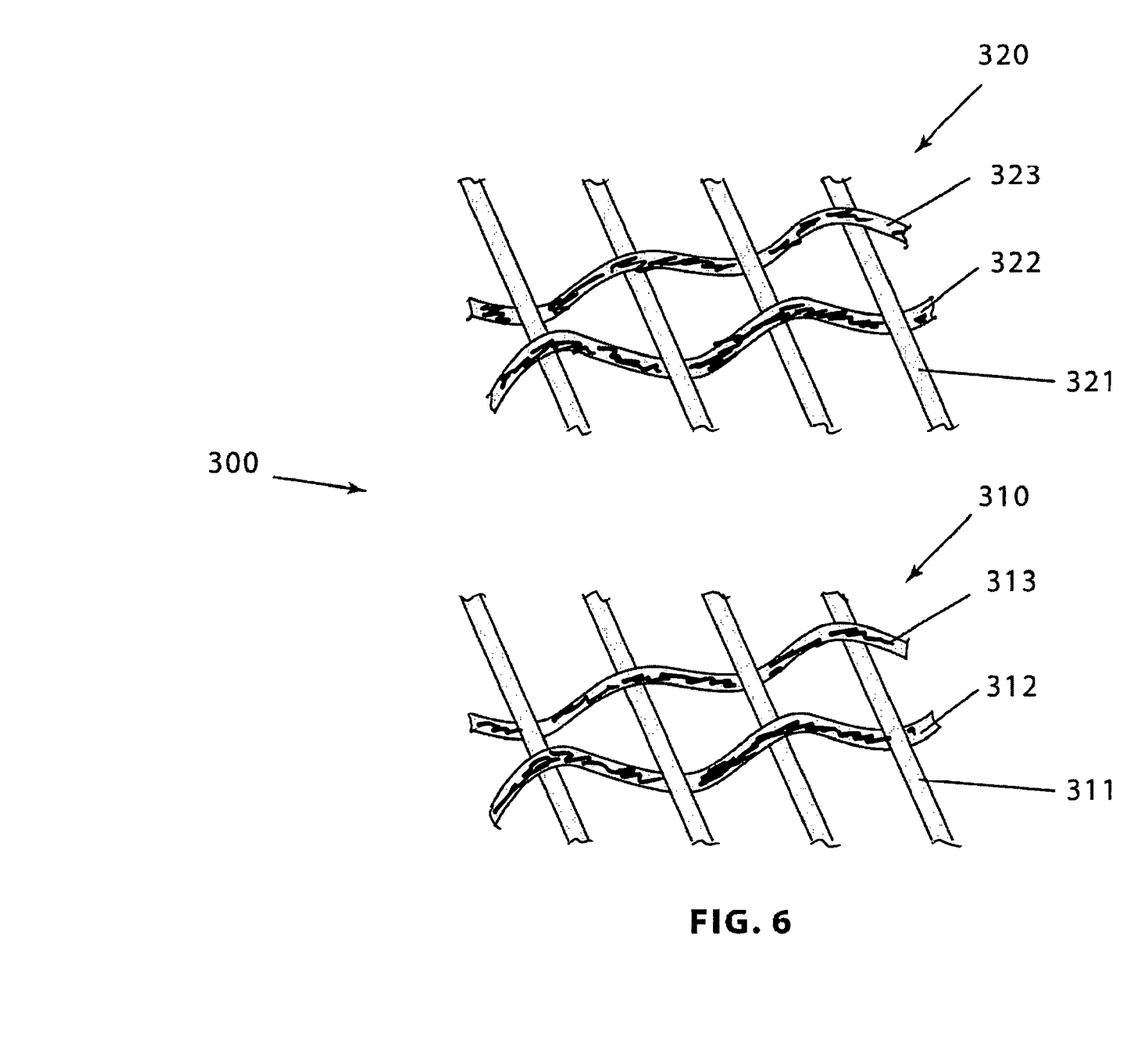
FIG. 6 is a graphic representation of a two-layer drum cover in accordance with the invention.

The two-layer drum cover is designed according to the "sacrificial anode" principle. In sacrificial anode designs, the non-load bearing members of both the backing wire 310 and face wire 320 are constructed of lower grade metal alloys than the respective load bearing members. As such, the non-load bearing members act as sacrificial anodes for the load bearing members in their respective wires. Further, the backing wire 310 acts as a sacrificial anode to protect the face wire 320. Due to such arrangement, corrosion occurs in the following sequence:

1. Non-load bearing lower grade members of the backing wire.
2. Non-load bearing higher grade members of the backing wire.
3. Non-load bearing lower grade members of the face wire.
4. Non-load bearing higher grade members of the face wire.

As shown in FIG. 6, the backing wire 310 is composed of a high-grade metal alloy 311 in the warp direction (load bearing member) such as an 8% Phosphor bronze warp and alternating metal alloys 312 and 313 in the shute direction (non-load bearing members). The metal alloys 312 and 313 are of a lower grade than the metal alloy 311. Additionally, metal alloys 312 and 313 tend to corrode at a faster rate than metal alloy 311. Metal alloys that may be used in the backing wire, include, but are not limited to, aluminum alloys, copper alloys, brass alloys, titanium alloys, nickel alloys, and magnesium alloys. By alternating the two metal alloys 312 and 313 in the shute direction, a two stage sacrificial anode is created in the backing wire 310.

Metal alloys 312 and 313 may be formed from alloys with different grades. For instance, metal alloy 312 may have a lower grade than metal alloy 313. Therefore, metal alloy 312 would act as a sacrificial anode for metal alloy 313 because it would corrode at a faster rate.

The face wire 320 is constructed in a manner similar to that of the backing wire 310. That is, face wire 320 has an alloy 321 in a warp direction and alternating alloys 322 and 323 arranged in the shute direction. The alloys 322 and 323 are of a lower grade than alloy 321. Preferably, alloys 321, 322, and 323 are stainless steel alloys.

Stainless steels are preferable because of their high resistance to corrosion in many environments. In order for steel to be classified as stainless, it must be composed of at least 12% chromium. It is the chromium that imbues the stainless steel with high corrosion resistance by forming a surface oxide that protects the iron-chromium alloy.

In general, there are four types of stainless steel alloys: ferritic, martensitic, austenitic, and precipitation hardening. The steel types are classified by their crystal structures.

Similar to metal alloys 312 and 313, alloys 322 and 323 may also be formed from alloys having different grades. For instance, metal alloy 322 may have a lower grade than metal alloy 323. Accordingly, metal alloy 322 would act as a sacrificial anode for metal alloy 323 because it would corrode at a faster rate.

Because the metal alloys used in the face wire 320 are of a higher grade than those used in the backing wire 310, an alloy used in the face wire 320 corrodes at a slower rate than the alloys in the backing wire. For example, a stainless steel alloy used in the face wire should corrode at a slower rate than that of the 8% Phosphor bronze alloy used in the backing wire warp.

The multi-stage sacrificial anode provides for many advantages over conventional drum cover designs. For instance, by providing two alternating metal alloys in the shute direction of the backing wire, the natural effects of corrosion on the face wire are delayed. This is due to the fact that corrosion of the face wire takes place only after complete corrosion of both metal alloys of the backing wire. As such, the life of the backing wire is extended due to the use of alternating metal alloys in the shute direction, which extends the life of the face wire and the drum cover as a whole, leading to an increase in the life of the drum. Additionally, due to the increased life of the drum cover, the cover does not need to be replaced as frequently as conventional drum covers.

It should be appreciated by one skilled in the art that the two-layer material of the invention may have uses other than those described above. The two-layer material may be used as a cover in many corrosive environments.

Modifications to the present invention would be obvious to those of ordinary skill in the art in view of this disclosure, but would not bring the invention so modified beyond the scope of the appended claims.

What is claimed is:

1. A two layer drum cover comprising:
   a backing wire consisting of a metal alloy in the warp direction and a plurality of metal alloys in the shute direction; and
   a face wire consisting of a metal alloy in the warp direction and a plurality of metal alloys in the shute direction,
   whereby the metal alloys used in the face wire have a higher grade than the metal alloys used in the backing wire.

2. The two-layer drum cover according to claim 1, wherein the metal alloy in the warp direction of said backing wire is 8% Phosphor bronze.

3. The two-layer drum cover according to claim 1, wherein the plurality of metal alloys in the shute direction of said backing wire have a lower grade than the metal alloy in the warp direction of said backing wire.

4. The two-layer drum cover according to claim 1, wherein the metal alloy in the warp direction of said face wire is a stainless steel alloy.

5. The two-layer drum cover according to claim 1, wherein the plurality of metal alloys in the shute direction of said face wire are stainless steel alloys.

6. The two-layer drum cover according to claim 1, wherein the plurality of metal alloys in the shute direction of said face wire have a lower grade than the metal alloy in the warp direction of said face wire.

7. The two-layer drum cover according to claim 1, whereby the metal alloys used in the face wire corrode at a slower rate than the metal alloys used in the backing wire.

8. A two layer drum cover comprising:
   a backing wire consisting of a metal alloy in the warp direction and a plurality of metal alloys in the shute direction; and
   a face wire consisting of a metal alloy in the warp direction and a plurality of metal alloys in the shute direction,
   whereby the plurality of metal alloys in the shute direction of said backing wire are composed of two distinct lower grades such that said plurality of metal alloys in the shute direction corrode at different rates.

9. A two layer drum cover comprising:
   a backing wire consisting of a metal alloy in the warp direction and a plurality of metal alloys in the shute direction; and
   a face wire consisting of a metal alloy in the warp direction and a plurality of metal alloys in the shute direction,
   whereby the plurality of metal alloys in the shute direction of said face wire are composed of two distinct lower grades such that said plurality of metal alloys in the shute direction corrode at different rates.

* * * * *